US011745818B2

(12) United States Patent
Hagimoto et al.

(10) Patent No.: US 11,745,818 B2
(45) Date of Patent: Sep. 5, 2023

(54) STRADDLE TYPE VEHICLE (71) Applicant: HONDA MOTOR CO., LTD., Tokyo (JP)

(72) Inventors: Masashi Hagimoto, Wako (JP); Yoshiyuki Kuroba, Wako (JP); Kiyoshi Katagiri, Wako (JP); Hiroshi Maeda, Wako (JP); Tsuyoshi Kumasaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 499 days.

(21) Appl. No.: 17/029,757

(22) Filed: Sep. 23, 2020

(65) Prior Publication Data
US 2021/0001945 A1 Jan. 7, 2021

Related U.S. Application Data (63) Continuation of application No. PCT/JP2018/013423, filed on Mar. 29, 2018.

(51) Int. Cl.
*B62J 45/41* (2020.01)
*B62J 45/42* (2020.01)
(Continued)

(52) U.S. Cl.
CPC ............... *B62J 27/00* (2013.01); *B62J 43/26* (2020.02); *B62J 45/40* (2020.02); *B62J 45/41* (2020.02);
(Continued)

(58) Field of Classification Search
CPC ..... B62J 45/41; B62J 45/42; B62J 6/04; B62J 45/40; B62J 50/26
See application file for complete search history.

(56) References Cited

U.S. PATENT DOCUMENTS 5,574,443 A * 11/1996 Hsieh ..................... B60R 1/00
348/E7.086
9,893,415 B2 * 2/2018 Hashimoto ............ B62J 15/00
(Continued)

FOREIGN PATENT DOCUMENTS

GB 2388091 A 11/2003
GB 2446845 A 8/2008
(Continued)

OTHER PUBLICATIONS

International Search Report for PCT/JP2018/013423 dated Jun. 19, 2018.
(Continued)

*Primary Examiner* — Tony H Winner
*Assistant Examiner* — Michael R Stabley
(74) *Attorney, Agent, or Firm* — Thomas | Horstemeyer, LLP (57) ABSTRACT

The present invention provides a straddle type vehicle, comprising: a taillight disposed in a rear portion of a vehicle and configured to emit light to rearward of the vehicle; a license plate disposed at the rear portion of the vehicle; and a detection unit configured to detect surrounding conditions behind the vehicle, wherein the detection unit is connected to a vehicle body frame via a support stay and is disposed to be lower than the taillight and higher than the license plate.

10 Claims, 6 Drawing Sheets (51) Int. Cl.
  *B62J 50/26* (2020.01)
  *B62J 27/00* (2020.01)
  *B62J 43/26* (2020.01)
  *B62J 45/40* (2020.01)
  *B62J 6/04* (2020.01)
(52) U.S. Cl.
  CPC .................. *B62J 45/42* (2020.02); *B62J 6/04* (2013.01); *B62J 50/26* (2020.02)

(56) References Cited

U.S. PATENT DOCUMENTS

| | | | |
|---|---|---|---|
| 10,061,992 B2* | 8/2018 | Gondo | G02B 27/0172 |
| 2006/0232389 A1* | 10/2006 | Chu | B60S 1/566 340/425.5 |
| 2006/0232670 A1* | 10/2006 | Chu | B60S 1/566 348/148 |
| 2016/0013545 A1* | 1/2016 | Hashimoto | H01Q 1/325 343/713 |
| 2017/0032195 A1* | 2/2017 | Gondo | H04N 23/58 |
| 2017/0101147 A1* | 4/2017 | Hasegawa | B62J 6/057 |
| 2018/0148116 A1* | 5/2018 | Kurata | B62J 6/04 |
| 2019/0161042 A1* | 5/2019 | Fuchs | B62J 45/422 |

FOREIGN PATENT DOCUMENTS

| | | | |
|---|---|---|---|
| JP | S60-132994 U | | 9/1985 |
| JP | S61-162777 A | | 7/1986 |
| JP | 2007062602 A | | 3/2007 |
| JP | 2016147619 A | | 8/2016 |
| JP | 2017039487 A | * | 2/2017 |
| JP | 2017039487 A | | 2/2017 |
| JP | 2017171223 A | | 9/2017 |
| WO | 2019186948 A1 | | 10/2019 |

OTHER PUBLICATIONS

IPRP for PCT/JP2018/013423 dated Jun. 10, 2020.
German Office Action for German Patent Application No. 112018007388.2 dated Sep. 16, 2022 (partially translated).

* cited by examiner

STRADDLE TYPE VEHICLE

CROSS-REFERENCE TO RELATED APPLICATION

This application is a continuation of International Patent Application No. PCT/JP2018/013423 filed on Mar. 29, 2018, the entire disclosures of which is incorporated herein by reference.

BACKGROUND OF THE INVENTION

Field of the Invention

The present invention relates to a straddle type vehicle, and particularly to a straddle type vehicle including a detection unit for detecting surrounding conditions behind the vehicle.

Background Art

In recent years, from the viewpoint of safety, a detection device for detecting surrounding conditions of a vehicle has been equipped on a straddle type vehicle (for example, a two-wheeled vehicle). Japanese Patent Laid-Open No. 2017-171223 discloses a detection device for detecting surrounding conditions ahead of the vehicle equipped below a head light of a two-wheeled vehicle.

In straddle type vehicles, to further improve safety, detecting surrounding conditions behind the vehicle in addition to ahead of the vehicle has become required, and accordingly there is a need of equipping a detection device for detecting surrounding conditions behind the vehicle at an appropriate position where erroneous detection can be prevented.

SUMMARY OF THE INVENTION

The object of the present invention is reducing erroneous detection in a detection device for detecting surrounding environments behind the vehicle.

According to one aspect of the present invention, there is provided a straddle type vehicle, comprising: a taillight disposed in a rear portion of a vehicle and configured to emit light to rearward of the vehicle; a license plate disposed at the rear portion of the vehicle; and a detection unit configured to detect surrounding conditions behind the vehicle, wherein the detection unit is connected to a vehicle body frame via a support stay and is disposed to be lower than the taillight and higher than the license plate.

Further features of the present invention will become apparent from the following description of exemplary embodiments with reference to the attached drawings.

DESCRIPTION OF THE EMBODIMENTS

The embodiment of the present invention will now be described with reference to the accompanying drawings. The present invention is not limited to the following embodiments, and includes changes and modifications of arrangements within the scope of the present invention. In addition, not all the combinations of features described in the embodiments are necessarily essential to the present invention.

Hereinafter, a straddle type vehicle according to an embodiment of the present invention will be described with reference to the drawings. In the present embodiment, description will be made on a motorcycle as an example of the straddle type vehicle. Moreover, in the drawings, arrow FR indicates a front-rear direction of the vehicle, and FT indicates a front side and RR indicates a rear side. Arrow W indicates a vehicle width direction, and LT indicates a left side and RT indicates a right side as seen in the front-rear direction of the vehicle. Arrow H indicates an up-down direction, and UR indicates an upper side and LR indicates a lower side. Note that the present invention will not be limited to the following embodiment, and encompasses modifications and variations in the configuration within the scope of spirit of the present invention. Moreover, not all combinations of the features described in the present embodiment are necessarily essential to the present invention.

Figure 1:
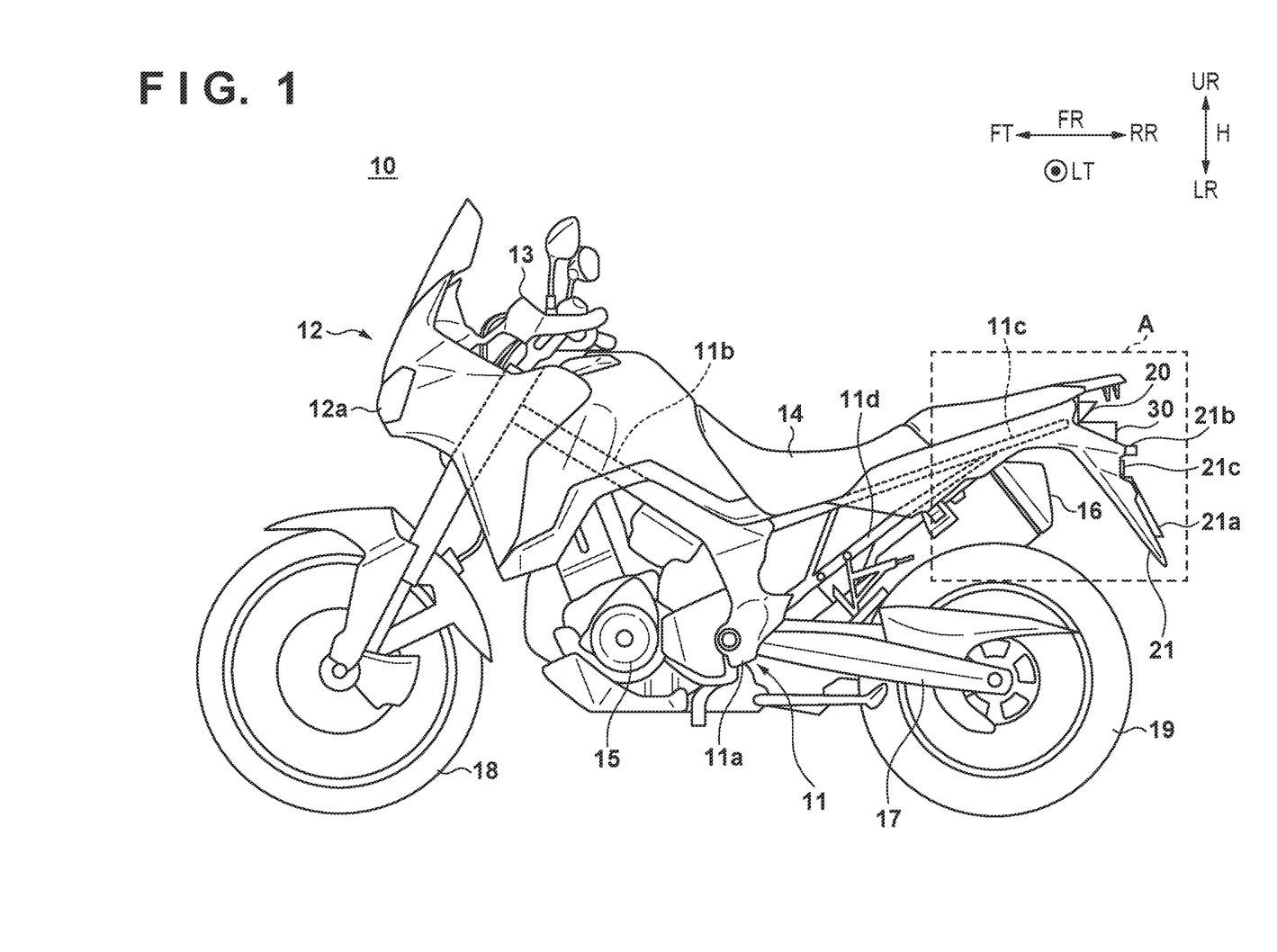
FIG. 1 is a view to show a straddle type vehicle.

FIG. 1 is a diagram to show a straddle type vehicle 10 of the present embodiment, showing a view of the straddle type vehicle 10 as seen from the left side. The straddle type vehicle 10 shown in FIG. 1 may include a vehicle body frame 11, a vehicle body cover 12, a steering handle 13, an occupant seat 14, a power unit 15, a muffler 16, a rear swing arm 17, a front wheel 18, a rear wheel 19, a taillight 20, and a rear fender 21.

The vehicle body frame 11 may include, for example, a center frame 11a, a mainframe 11b extended from the center frame 11a toward forward of the vehicle, a seat rail 11c extended from the center frame 11a toward rearward of the vehicle, and aback stay 11d extended from the center frame 11a toward rearward of the vehicle and connected to the rear portion of the seat rail 11c.

The vehicle body cover 12 is configured to cover the vehicle body frame 11 and is provided with a headlight 12a at a front portion thereof. The steering handle 13 is pivotally supported by a head pipe provided at a front end of the mainframe 11b and is configured to be able to steer the front wheel 18. The occupant seat 14 is disposed behind the steering handle 13. The power unit 15 includes an engine and a transmission that changes the output of the engine, and the output of the transmission is transferred to the rear wheel 19 through a chain transmission mechanism. Combusted gas to be discharged from an exhaust unit of the engine is discharged from the muffler 16. The rear wheel 19 is suspended by the rear swing arm 17 pivotally supported by the center frame 11a.

In the rear portion of the straddle type vehicle 10, a taillight 20 is provided which lights up in response to driver's brake operation and emits light to rearward of the vehicle. Moreover, a rear fender 21 that is supported by the vehicle body frame 11 (for example, a seat rail 11c) and covers the rear upper portion of the rear wheel 19 is provided in a lower portion of the taillight 20. In the rear fender 21, there is provided a license plate 21a, a light 21b for illuminating the license plate 21a, and a reflector 21c.

In recent years, from the viewpoint of safety, the straddle type vehicle 10 has been required to be equipped with a detection unit 30 that detects surrounding conditions of the vehicle 10, and output (notify) information by display or voice to alert the driver or assist its steering operation by a control unit (not shown) such as an ECU depending on the surrounding conditions detected by the detection unit 30. As the detection unit 30, for example, a millimeter wave radar and a laser radar can be used. In the present embodiment, an example in which a millimeter wave radar is used as the detection unit 30 will be described.

Such a detection unit 30 may be provided at the front end of the vehicle 10 so as to detect surrounding conditions ahead of the vehicle; however, to further improve safety, there is need of providing the detection unit 30 at the rear end of the vehicle 10 as well. On the other hand, in the detection unit 30 (for example, a millimeter wave radar), if an object other than a detection target, such as a metal member, which does not easily transmit radio waves (millimeter waves), is present within the emission range of the radio waves, erroneous detection is more likely to occur due to the influence of the object. Therefore, it is preferable to dispose the detection unit 30 such that other members of the vehicle 10 that are less likely to transmit radio waves are not present on the rearward side (on the emission direction side of radio waves) with respect to the emission surface 31 of radio waves. Further, since the detection unit 30 is likely to cause erroneous detection when it is close to the road (road surface), it is preferable to dispose the detection unit 30 at a position as far as possible from the road (road surface).

Accordingly, in the straddle type vehicle 10 of the present embodiment, the detection unit 30 for detecting surrounding conditions behind the vehicle is disposed to be lower than the taillight 20 and higher than the license plate 21a (between the taillight 20 and the license plate 21a). Since, as a result of disposing the detection unit 30 in this manner, other members of the vehicle 10 that do not easily transmit radio waves are not disposed in the emission direction of the radio wave from the detection unit 30 (that is, on the vehicle rearward side with respect to the emission surface 31 of radio waves), it is possible to avoid erroneous detection caused by the other members. Further, since the detection unit 30 can be disposed to be spaced apart from the road (road surface), erroneous detection due to the influence of the road can also be reduced (prevented).

Figure 2:
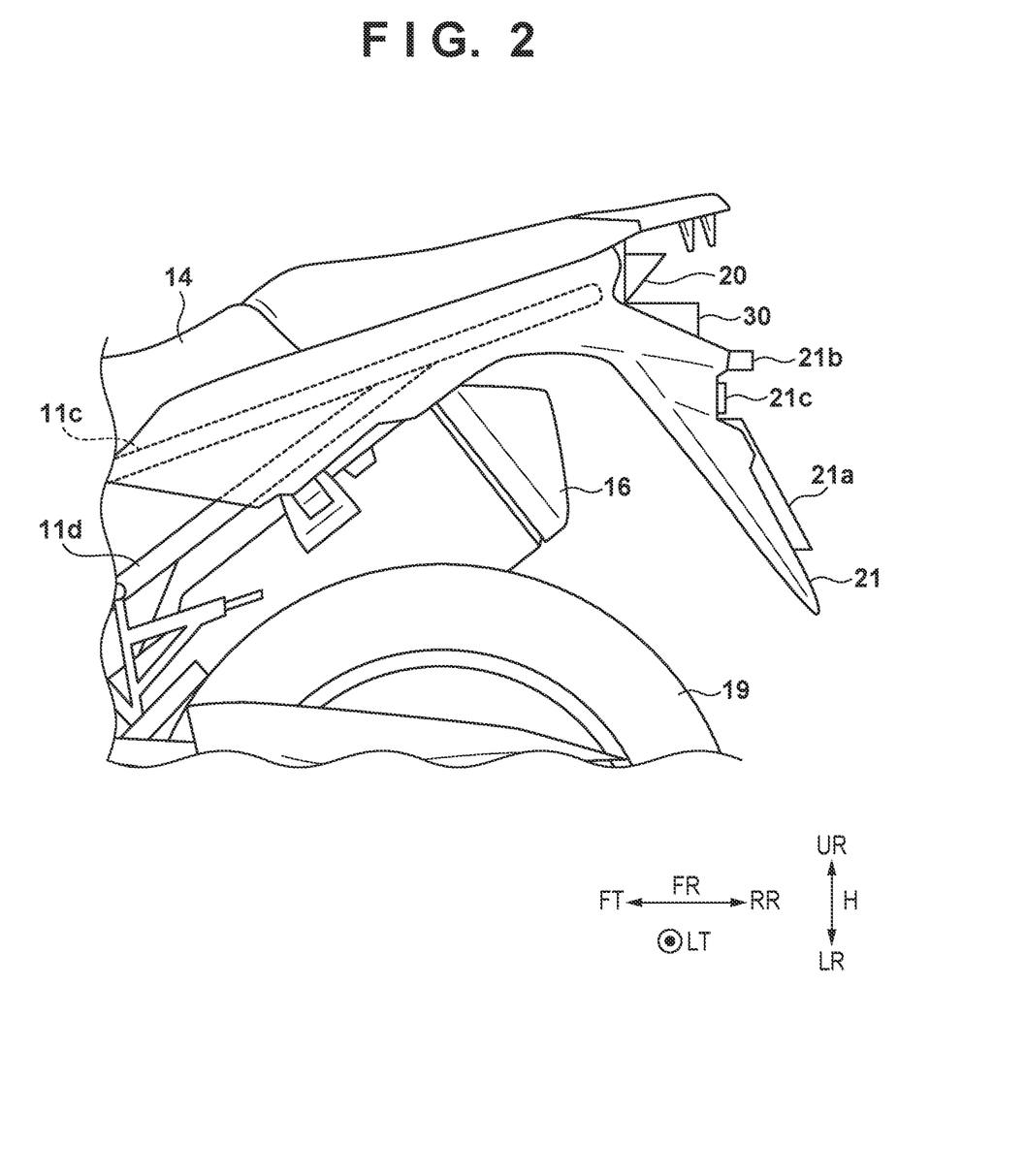
FIG. 2 is an enlarged view of a rear portion of the straddle type vehicle.
Figure 3:
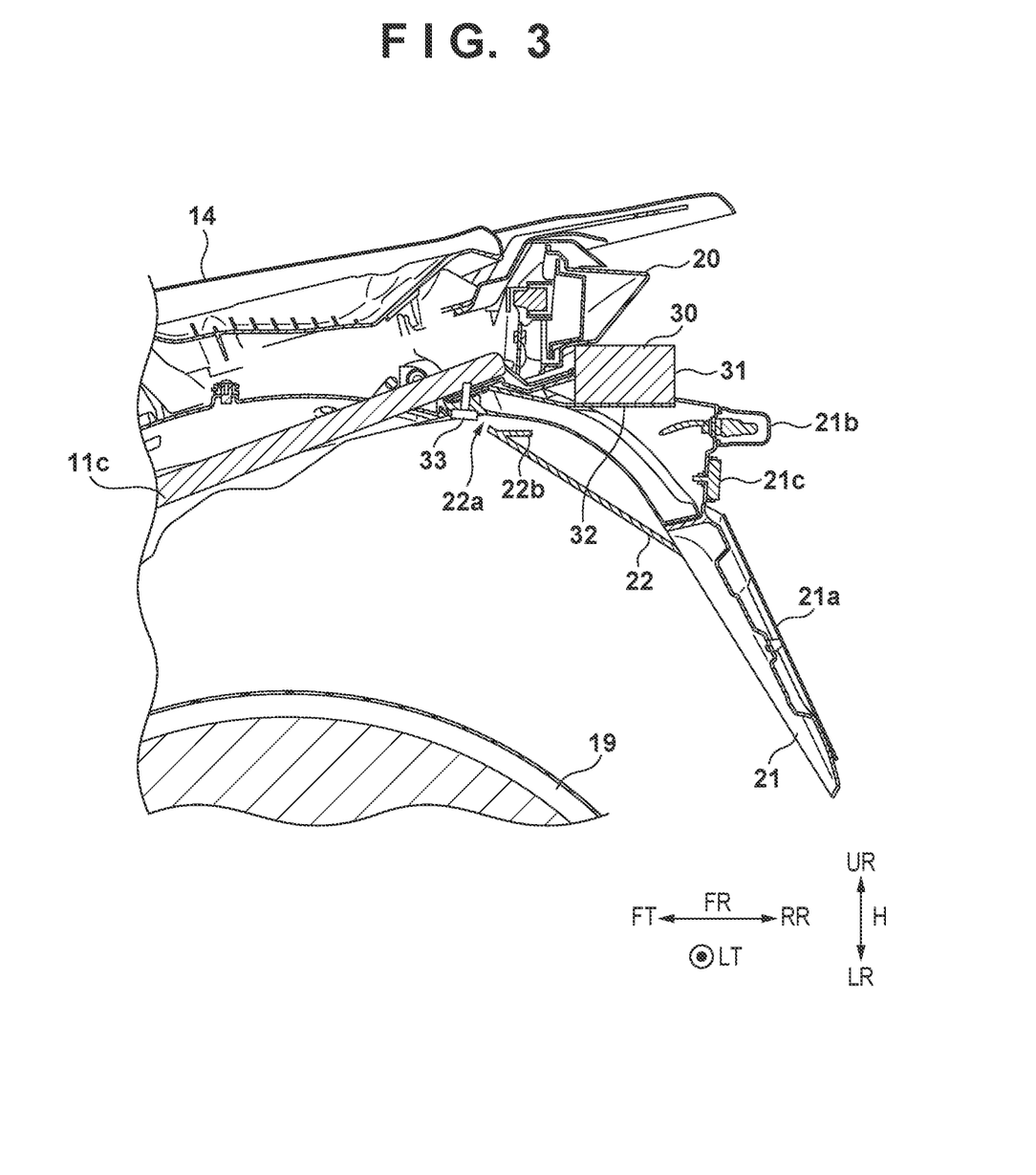
FIG. 3 is a sectional view of a rear portion of the straddle type vehicle.
Figure 4:
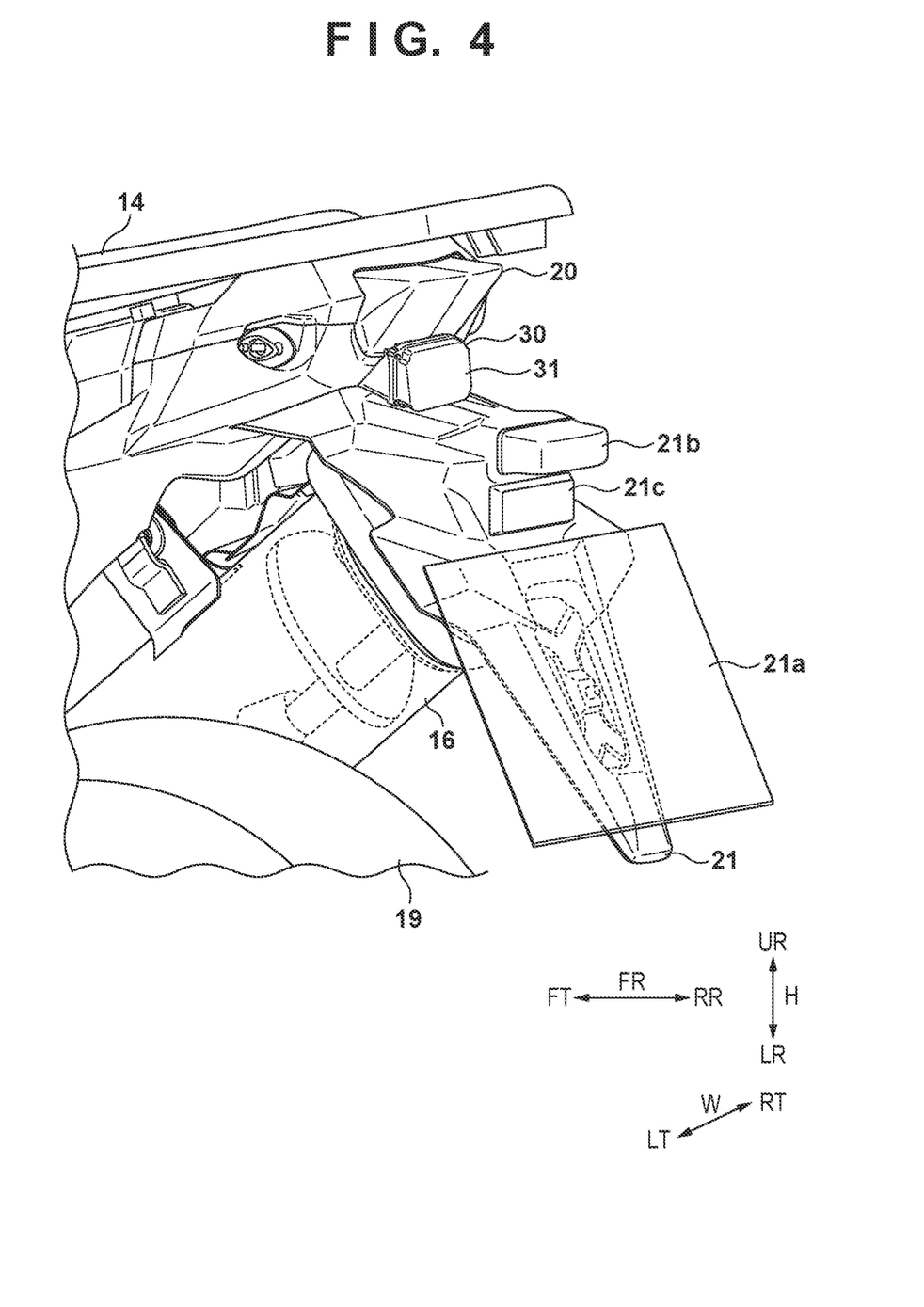
FIG. 4 is a view of the rear portion of the straddle type vehicle as seen from obliquely rearward and sideward.

Hereinafter, a specific layout example of the detection unit 30 will be described with reference to FIGS. 2 to 4. FIG. 2 shows an enlarged view of a rear portion (a region A of FIG. 1) of the straddle type vehicle 10 and FIG. 3 shows a sectional view thereof. Moreover, FIG. 4 shows a view of the rear portion (the region A of FIG. 1) of the straddle type vehicle 10 as seen from obliquely rearward and sideward As shown in FIGS. 2 to 4, the detection unit 30 is disposed to be lower than the taillight 20 provided at the rear portion of the vehicle 10 and to be higher than the license plate 21a attached to the rear fender 21, in the vehicle up-down direction. Moreover, as described above, if another member (for example, a metal member) that does not easily transmit radio waves is present on a rearward side with respect to the emission surface 31 of radio waves, erroneous detection becomes more likely to occur, and therefore, the detection unit 30 may be disposed such that the other member is not present on the rearward side with respect to the emission surface 31. Here, the rear fender 21 may be made of a material that easily transmits radio waves emitted from a millimeter wave radar, such as resin and plastic materials. For that reason, the millimeter wave radar as the detection unit 30 may be provided inside the rear fender 21.

The detection unit 30 is, as shown in FIG. 3, supported by, for example, the vehicle body frame 11 (the seat rail 11c). Specifically, the detection unit 30 is connected to the vehicle body frame 11 (the seat rail 11c) via a support stay 32. The support stay 32 is made of, for example, a metal material and fixed to the vehicle body frame 11 (the seat rail 11c) by a screw 33 or the like. At this time, from the viewpoint of reducing the assembly man-power and the number of components, the support stay 32 may be fixed to the vehicle body frame 11 along with the rear fender 21 with the screw 33 as shown in FIG. 3. In other words, the support stay 32 and the rear fender 21 may be fastened together to the vehicle body frame 11 with the screw 33. Thus, as a result of the detection unit 30 being supported by the vehicle body frame 11, it is possible to increase attaching rigidity between the detection unit 30 and the vehicle 10, thereby suppressing fluctuation of the detection angle of the detection unit 30 due to vibration. Moreover, the detection unit 30 may be fixed to the support stay 32 via a vibration reducing member. The vibration reducing member is a member capable of reducing the vibration transmitted from the support stay 32 to the detection unit 30, and for example, a rubber mount or the like may be used therefor.

Figure 5:
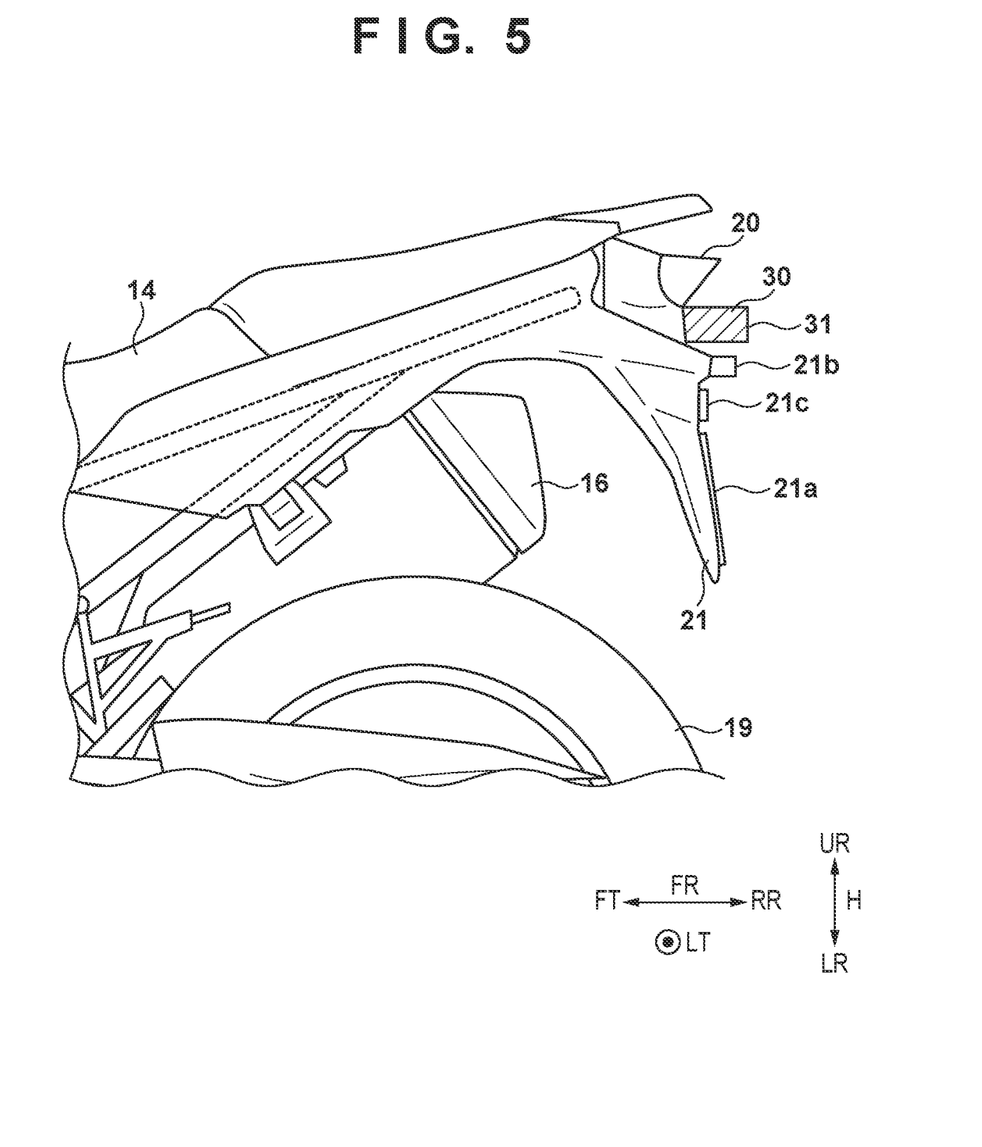
FIG. 5 is an enlarged diagram to show a variation of disposition of a detection unit at the rear portion of the straddle type vehicle.

Here, even if the detection unit 30 is disposed such that another member such as a metal member is not present on the rearward side of the emission surface 31 of radio waves, for example as shown in FIGS. 2 to 4, there is a case in which erroneous detection occurs due to effects of the license plate 21a and the light 21b. In that case, for example as shown in FIG. 5, the detection unit 30 may be disposed such that the rear end (the emission surface 31) of the detection unit 30 is at the same position as the upper end (or the rear end) of the license plate 21a and the rear end of the light 21b, or, on the vehicle rearward side with respect to the upper end (or the rear end) of the license plate 21a and the rear end of the light 21b, in the front-and-rear direction of the vehicle 10. FIG. 5 is an enlarged diagram to show a variation of the disposition of the detection unit 30 at the rear portion of the straddle type vehicle 10. In an example shown in FIG. 5, the detection unit 30 is disposed such that the rear end (emission surface 31) thereof is on the vehicle rearward side with respect to the upper end (or the rear end) of the license plate 21a and the rear end of the light 21b, and the rear end of the taillight 20, in the vehicle longitudinal direction. More preferably, the detection unit 30 may be disposed such that none of the members of the vehicle 10 is present on the vehicle rearward side with respect to the rear end of the detection unit 30 in the vehicle longitudinal direction.

Figure 6:
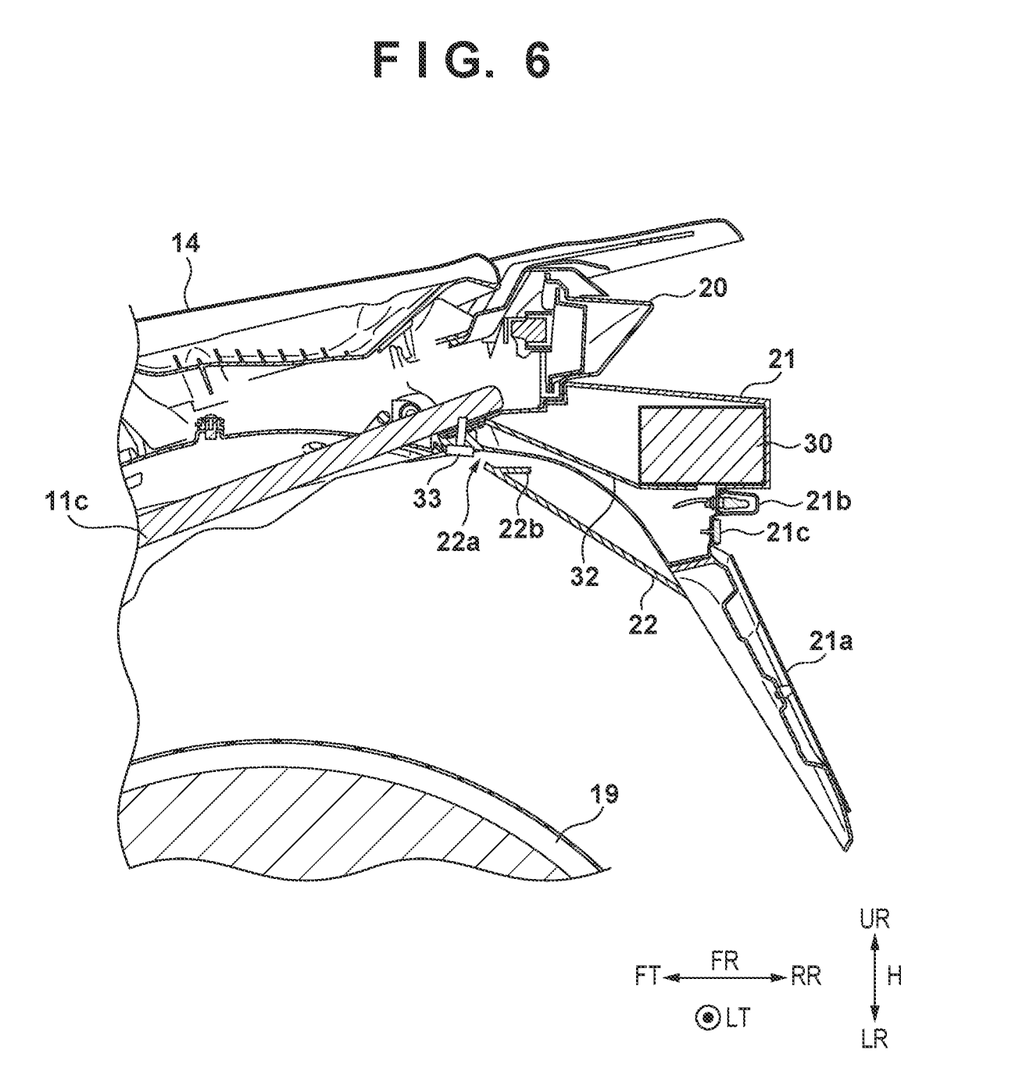
FIG. 6 is an enlarged diagram to show a variation of disposition of the detection unit at the rear portion of the straddle type vehicle.

Moreover, the detection unit 30 may be disposed inside the rear fender 21. FIG. 6 is an enlarged view to show a variation of the disposition of the detection unit 30 at the rear portion of the straddle type vehicle 10. The detection unit 30 shown in FIG. 6 is supported by the support stay 32 that is fixed to the vehicle body frame 11 along with the rear fender 21 with the screw 33, and is disposed inside the rear fender 21 located above the light 21b and the reflector 21c. Although, in the example shown in FIG. 6, the detection unit 30 is disposed such that the rear end (the emission surface 31) of the detection unit 30 is located on a vehicle forward side with respect to the upper end (or the rear end) of the license plate 21a, it is preferable as in the description in FIG. 5 to dispose the detection unit 30 such that the rear end of the detection unit 30 is located at the same position as the upper end (or the rear end) of the license plate 21a, or on the vehicle rearward side with respect to the upper end (or the rear end) of the license plate 21a.

Further, in a straddle type vehicle in which the detection unit 30 is provided as in the present embodiment, to prevent water and mud wound up by the rear wheel 19 from hitting the detection unit 30, as shown in FIG. 3 and FIG. 6, a protective cover 22 for protecting the detection unit 30 from water and mud splashes from the rear wheel 19 may be provided between the detection unit 30 and the rear wheel 19. The protective cover 22 may be configured such that an opening 22a (a gap) is formed between the front end of the protective cover 22 and the rear fender 21 so as to be able to air cool the detection unit 30. Moreover, the protective cover 22 may be configured to have a mechanism 22b for introducing air taken from the opening 22a into the detection unit 30.

As described above, in the straddle type vehicle 10 of the present embodiment, the detection unit 30 for detecting surrounding conditions behind the vehicle is disposed to be lower than the taillight 20 and higher than the license plate 21a. This makes it possible to reduce possibility that the detection unit 30 causes erroneous detection, and thereby to improve safety.

Summary of Embodiments

1. A straddle type vehicle of the above described embodiment includes
a taillight (20) that is disposed at a rear portion of a vehicle (10) and emits light to rearward of the vehicle,
a license plate (21a) disposed at the rear portion of the vehicle, and a detection unit (30) for detecting surrounding conditions behind the vehicle,
wherein the detection unit is disposed to be lower than the taillight and higher than the license plate.

According to this embodiment, since the detection unit is disposed to be lower than the taillight and higher than the license plate, it is possible to reduce erroneous detection caused by an object other than the detection target being present within an emission range of radio waves, and erroneous detection due to effects of the road (the road surface), thereby ensuring detection performance and enabling detection of a wide-angle range.

2. In the above described embodiment,
the detection unit is supported by a vehicle body frame (11).

According to this embodiment, since the detection unit is supported by the vehicle body frame, it is possible to increase attaching rigidity between the detection unit and the vehicle, as well as to suppress fluctuation of the detection angle of the detection unit due to vibration.

3. In the above described embodiment,
the detection unit is connected to the vehicle body frame via a support stay (32).

According to this embodiment, since the detection unit is connected to the vehicle body frame via a support stay, it is possible to increase a degree of freedom for attaching the detection unit to the vehicle body frame.

4. In the above described embodiment,
the straddle type vehicle further includes a rear fender (21) that covers a rear upper portion of a rear wheel (19), wherein the license plate is provided in the rear fender.

According to this embodiment, since the license plate is provided at the rear fender, it is possible in the detection unit to reduce erroneous detection due to effects of another member (particularly, the license plate) of the vehicle.

5. In the above described embodiment,
the support stay and the license plate are fastened together and fixed to the vehicle body frame.

According to this embodiment, since the support stay and the license plate are fastened together and fixed to the vehicle body frame, it is possible to reduce an assembly man-hour and the number of components of the straddle type vehicle.

6. In the above described embodiment,
the detection unit is disposed such that a rear end thereof is located at a same position as an upper end of the license plate, or on a vehicle rearward side with respect to the upper end of the license plate, in a vehicle longitudinal direction.

According to this embodiment, the detection unit is disposed such that the rear end thereof is located at a same position as the upper end of the license plate, or on a vehicle rearward side with respect to the upper end of the license plate, in the vehicle longitudinal direction. Therefore, it becomes possible in the detection unit to reduce erroneous detection due to the influence from other members of the vehicle, further enabling to ensure detection performance and detect a wide-angle range.

7. In the above described embodiment,
the straddle type vehicle further includes a protective cover (22) disposed between the detection unit and a rear wheel for protecting the detection unit.

According to this embodiment, since the straddle type vehicle further includes the protective cover disposed between the detection unit and the rear wheel for protecting the detection unit, it is possible in the detection unit to reduce effects of water and mud splashes from the rear wheel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A straddled vehicle, comprising:
a taillight disposed in a rear portion of a vehicle and configured to emit light to rearward of the vehicle;
a rear fender configured to cover a rear upper portion of a rear wheel;
a license plate provided on the rear fender at the rear portion of the vehicle; and
a detection unit configured to detect surrounding conditions behind the vehicle,
wherein the detection unit is connected to a vehicle body frame via a support stay and is disposed to be lower than the taillight and higher than the license plate, and
wherein the support stay and the rear fender are fastened together and fixed to the vehicle body frame with a common screw, such that a part of the rear fender is disposed between a part of the support stay and the vehicle body frame.

2. The straddled vehicle according to claim 1, wherein the detection unit is disposed such that a rear end thereof is located at a same position as an upper end of the license plate, or on a vehicle rearward side with respect to the upper end of the license plate, in a vehicle longitudinal direction.

3. The straddled vehicle according to claim 1, further comprising a protective cover disposed between the detection unit and the rear wheel for protecting the detection unit.

4. The straddled vehicle according to claim 3, wherein the protective cover is disposed such that an opening is formed between a front end of the protective cover and the rear fender to air cool the detection unit by air taken from the opening.

5. The straddled vehicle according to claim 4, wherein the protective cover is configured to have a mechanism for introducing air taken from the opening into the detection unit.

6. The straddled vehicle according to claim 4, wherein
the detection unit is configured to detect the surrounding conditions using radio waves,
the rear fender is made of a material that transmits the radio waves, and
the detection unit is disposed inside the rear fender.

7. The straddled vehicle according to claim 1, wherein
the vehicle body frame includes a seat rail on which an occupant seat is provided, and
the detection unit is connected to the seat rail via the support stay.

8. The straddled vehicle according to claim 1, wherein the detection unit is fixed to the support stay via a vibration reducing member configured to reduce vibration transmitted from the support stay to the detection unit.

9. The straddled vehicle according to claim 1, wherein
the detection unit is configured to detect the surrounding conditions using radio waves, and
the rear fender is made of a material that transmits the radio waves.

10. The straddled vehicle according to claim 9, wherein the detection unit is disposed inside the rear fender.

* * * * *